United States Patent Office 2,874,059
Patented Feb. 17, 1959

2,874,059

METHOD OF PRESERVING APPLES

Myron J. Powers, Lafayette, and Melvin E. Lazar, Oakland, Calif., assignors to the United States of America as represented by the Secretary of Agriculture No Drawing. Application March 18, 1957
Serial No. 646,937

5 Claims. (Cl. 99—186)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel methods for preserving apples. In particular, the invention is concerned with improvements in the basic food preservation process known as dehydrocanning.

In the dehydrocanning method of food preservation, a fresh food such as apples, peaches, peas, etc. is first partially dehydrated, that is, its moisture content is reduced to the level of about 35 to 70%. The partially dehydrated food is then canned, that is, sealed in a suitable container and heat processed to ensure sterility. This dehydrocanning process, described in the patent of V. F. Kaufman, M. J. Powers, and W. F. Talburt, No. 2,718,470, offers many advantages over conventional preservation procedures such as dehydration and canning. For example, conventional dehydrated foods do not taste like the fresh materials—the dehydration to the necessarily low moisture levels causes deleterious changes in color and flavor of the food. In contrast, dehydrocanned foods retain to a considerable extent the natural color and flavor of the fresh food. As compared to conventional canned products, the dehydrocanned products offer the advantage that a large percentage of the original moisture in the fresh food has been removed with the result that more actual food material can be placed in a container of given size. The elimination of moisture results in substantial savings in container, shipping, and storage costs.

In preparing dehydrocanned apples by previous techniques, it has been advocated that the apples be sulphited prior to dehydration to prevent browning of the apple tissue. This process of sulphiting which involves dipping the apple slices in an aqueous solution of sulphur dioxide or a water-soluble sulphite or bisulphite, has the desired effect of maintaining the color of the tissue at least during processing and also during storage of the product in the canned state, if packed in the right type of container. However, the use of sulphiting gives rise to certain disadvantages which are explained as follows:

In order to obtain a product which maintains its natural color on storage in the canned state, it is necessary to put up the sulphited, partially dehydrated apple slices in bright cans, that is, cans in which the interior is uncoated tin plate. Under such conditions, the apples retain their bright natural color for long periods and it is believed that oxidative darkening of the apple tissue does not take place because the tin acts as reducing agent and is preferentially oxidized by the oxygen present in the can. Although the color of the apple slices is maintained in this way, the flavor of the apples tends to decrease with time of storage, the products developing what might be termed a "fishy" or "metallic" taste. Also, the sulphite in the apples is reduced to hydrogen sulphide by the tin plate whereby a very disagreeable odor is produced in the product. If the sulphited, partially dehydrated apple slices are put up in enamelled cans, that is, cans in which the interior is coated with an enamel-like protective coating, the apples on storage do not develop such fishy or metallic taste or hydrogen-sulphide odors but on the other hand they do not maintain their original color but turn brown. In the enamelled can the reductive action of the tin plate is not obtained and chemical oxidative browning can take place.

It has now been found that the step of sulphiting can be eliminated by a novel treatment of the apple slices. By the treatment of this invention the bright natural color of the apples is retained and also the natural flavor of the product is retained. The undesirable color and flavor changes which occur with the sulphited apples do not take place when the fruit is preserved by the process of this invention.

Briefly described, the procedure of the invention involves the following steps:

(a) The fresh fruit pieces are dipped in an aqueous solution containing salt and citric acid.

(b) The fruit pieces are then partially dehydrated.

(c) The partially dehydrated fruit pieces are then blanched and canned. This is preferably accomplished by blanching the fruit pieces with steam and packing them into cans which are then sealed and heat processed to ensure sterility. In the preferred modification of the invention, a syrup is added to the fruit in the cans prior to sealing.

The procedure is explained more fully below:

Initially the fresh produce is subjected to the usual preliminary preparative steps such as washing, peeling, trimming, removal of seeds or cores, and cutting into convenient pieces such as wedges, slices, dice, etc. The particular preliminary treatment will in any case depend on the type of fruit being handled. For example, in operating on apples, the fruit is washed, peeled, cored, trimmed and cut into wedges, say, eighths to sixteenths. In the case of apricots, the peeling step may be eliminated and the unpeeled fruit merely halved or cut into pieces.

To prevent discoloration (browning) of the surface of the fruit during the partial dehydration step, the fruit prior to dehydration is treated with an enzyme-inhibiting agent other than a sulphitnig agent. A preferred technique is to dip the fruit in an aqueous solution of citric acid and salt (sodium chloride). Usually a solution is used containing about 1% of each of these ingredients. However, these proportions are by no means critical and may be higher or lower depending on such factors as the kind and variety of fruit, maturity, size of the pieces, the degree of dehydration to be employed, etc. In any particular case, pilot trials with different concentrations of citric acid and salt may be conducted to select the concentrations which yield the desired result of maintaining the natural color of the fruit during the subsequent partial dehydration step. In many instances, the concentrations of citric acid and salt may each vary from about 0.5% to 2%. Usually the food is dipped into the solution for a short period of time of about a minute or two but the fruit may be left in the solution longer without injury to hold it until ready for the partial dehydration. Holding it in the solution will prevent browning in this interim holding period. It is not essential to use citric acid and one may substitute other fruit acids such as tartaric, malic, etc. If desired, the dipping solution may also contain about 0.1 to 1% of ascorbic acid to increase the color-stabilizing effect of the solution. However, the ascorbic acid is not an essential component; the salt and citric acid dip modifies the surface layers of the apple tissue so that browning does not take place. Although a dipping treatment is generally preferred as being simpler and effective, it is obvious that the preservative solution may be applied to the fruit by other application techniques such as spraying.

After treatment with the preservative solution, the food pieces are subjected to partial dehydration. This is preferably conducted in the usual types of apparatus which provide a draft of hot air about the food pieces to cause rapid evaporation of moisture. Thus forced-air dehydrators of the tunnel, cabinet, continuous belt, or rotary kiln type may be employed. The temperature of the air should be about 130 to 180° F. To prevent browning of the fruit during this partial dehydration, it is preferred to conduct the dehydration as rapidly as possible. Such conditions as using through-flow air, high air velocity, high air temperature, and small piece size favor rapid evaporation of moisture. It is also desirable to avoid undue increase in piece temperature (temperature of the fruit itself) during this step to avoid internal browning. The piece temperature which can be tolerated depends on several factors including the variety of the fruit, maturity, time at which the piece is maintained at this temperature, etc. In the treatment of apples, for example, it is preferred to keep the piece temperature below 110–120° F. by suitable adjustment of air temperature, particularly by decreasing the air temperature during the later stages of the partial dehydration. In some unusual cases, a piece temperature as high as 135° F. can be tolerated. The dehydration is continued until the fruit has lost at least 55% of its weight by elimination of moisture. The extent of dehydration may be varied and in general the moisture content of the partially dehydrated fruit may be from about 35 to 70%.

The partially dehydrated fruit is then ready for canning. This step can be accomplished in a number of different ways. Preferably the partially dehydrated fruit pieces are removed from the dehydrator and without any undue delay are contacted with steam to inactivate the oxidative enzymes responsible for browning and to sterilize the fruit. This blanching is preferably applied within 30 minutes after the partial dehydration is completed to minimize any possibility that the fruit will brown before the enzymes are inactivated by blanching. The blanching is conducted by contacting the fruit pieces with a gaseous medium such as steam or a mixture of steam and air, the temperature of the medium being about 195 to 212° F. and the time of contact with the fruit pieces being about 1 to 6 minutes. It is preferable to apply a steam-air mixture rather than steam alone since in this way the desired effects of enzyme inactivation and sterilization can be accomplished by heating the fruit pieces to a temperature about from 195 to 205° F. rather than heating them to higher temperatures near the boiling point. It has been observed that if apple pieces are treated with steam alone they become so hot that intercellular air is driven out of the tissue. As a result the apple pieces have a translucent, unnatural appearance. Where a mixture of steam and air is employed, the intercellular air is not expelled and the apple pieces retain their usual opaque appearance and creamy color. In this regard the air in the apple tissue exerts a desirable pigmenting effect and if the air is retained in the tissue, the apple pieces have a more attractive and natural appearance.

It has also been observed that blanching without expulsion of air from the apple tissue can be performed with steam alone if the time of application of steam is limited to avoid raising the temperature of the apple tissue above 205° F. To this end, the apple slices are contacted with steam for about 1 minute then held in an insulated zone until the enzymes are inactivated; this may require about 1 to 5 minutes. In this way the initial contact with steam is insufficient to unduly heat the apple tissue to drive out air yet the heating is adequate to inactivate the enzymes present in the fruit tissue. For accomplishing this phase of the process, the apple slices may be conveyed on a mesh belt through a blancher which is provided with steam jets only at its entrance end. The speed of the belt is so adjusted that the fruit pieces are subjected to steam for 1 minute then carried through an insulated zone of the blancher. In this zone, no heat is applied and the insulation retards loss of heat by the fruit pieces. The insulated zone is of such length that by the time the fruit pieces emerge, the enzymes have been completely inactivated and they have been rendered sterile.

After the fruit pieces have been subjected to steam or steam-air mixture as above described to sterilize them and to inactivate the enzymes, the hot fruit is immediately packed into suitable containers which are immediately sealed, optionally under vacuum, and then heated to ensure sterilization of the product and particularly to sterilize the formerly cold, unsterile container. This heating may be accomplished, for example, by contacting the sealed containers with steam or boiling water for about 5 to 10 minutes. After such heat processing, the cans are cooled with cold water to about body temperature, then stacked to permit air drying of the containers and further cooling.

In the preferred modification of the invention, the fruit is packed in containers together with sugar syrup. That is, the fruit immediately after blanching and without cooling is packed into a container so that the interstices between the fruit pieces are filled with the syrup. Usually the fruit is packed tightly into the container so as to limit the required amount of syrup to about 10–15% of the weight of the fruit. In this way the degree of remoistening of the fruit by the syrup is minor and the fruit remains in a partially dehydrated condition. It is also to be noted that this syrup is eventually absorbed by the fruit so that the product is a dry pack, that is, it consists of the pieces of solid fruit with essentially no free liquid. When the fruit is packed with syrup in accordance with this modification of the invention, the extent of partial dehydration may be initially raised to compensate for the absorption of moisture so that the pack in such event will still contain about from 35 to 70% water. The syrup used for the purpose generally contains about 20 to 60% sugar, a concentration of 25% being preferred. Sucrose is the preferred sugar but others can be used, for example dextrose, invert sugar, etc. The syrup also preferably contains citric acid in a concentration of about 0.1 to 5%, preferably about 1%. Other fruit acids such as tartaric, malic, etc. may be substituted in whole or in part for the citric acid. It is also preferred to add to the syrup ascorbic acid in a concentration of about 0.1 to 1%. One of the main purposes of the syrup is that it displaces air from the interstices between the slices so that the possibility of oxidative damage to the canned product or the cans is decreased or eliminated. Another point is that the syrup acts as a heat transfer medium so that sterilization during the subsequent heat processing can be accomplished more efficiently. The amount of syrup used will depend mainly on the fill-in weight and on the size and shape of the fruit pieces being canned. Thus where the pieces are compressed into the can, the total free space will be smaller and hence less syrup will be needed than in cases where the pieces are loosely packed. In the case of fruit pieces packed tightly in the can, the weight of syrup will be about 5 to 15% of the weight of the fruit pieces. The syrup is preferably hot (about 200° F.) when added to the food pieces so that it is in sterile condition and will not introduce bacterial contaminants into the container. After introduction of the syrup, the cans are sealed and heat processed as above described.

The invention is further demonstrated by the following illustrative examples.

EXAMPLE I

A batch of fresh Newtown Pippin apples was peeled, cored, and sliced.

(a) The apple slices were given a 2-minute dip in an aqueous solution containing 1% salt and 1% citric acid.

(b) The slices were drained then dehydrated in a current of air having a dry bulb temperature of 150° F. and a wet bulb temperature of 85° F. The dehydration took about 80 minutes and the weight reduction, due to loss of moisture, was 55%. The moisture content of the partially dehydrated slices was approximately 65%.

(c) The partially dehydrated slices were removed from the drier and immediately subjected to the direct action of steam to heat them to 200° F., this temperature being maintained for 4 minutes at the end of which time the net weight reduction was changed to 50%, due to the moistening effect of the steam.

(d) The hot fruit was immediately packed into No. 2 sanitary cans using two types of cans, one lot being packed in bright tin cans, another lot being packed in enamelled cans. The packed cans were immediately sealed.

(e) The sealed cans were heat processed at 212° F. for 10 minutes then cooled. The canned products were stored for 6 months at room temperature.

(f) After the above storage period the cans were opened and the products were examined. It was found that both products had good flavor, the products packed in the bright tin cans had a bright natural color, the products packed in the enamelled cans had a light golden color.

*Comparative Experiment A*

The procedure of Example I was repeated with the sole exception that the dipping solution of part a was an aqueous solution containing 0.05% sulphur dioxide. Examination of the canned products revealed the following: The product packed in bright tin cans had a bright natural color but an unpleasant metallic taste and gave off an odor of hydrogen sulphide. The product packed in enamelled cans had a fairly good flavor but had a brown color.

EXAMPLE II

A batch of fresh Newtown Pippin apples was peeled, cored, and sliced.

(a) The apple slices were given a 2-minute dip in an aqueous solution containing 1% salt and 1% citric acid.

(b) The slices were drained then dehydrated in a current of air having a dry bulb temperature of 150° F. and a wet bulb temperature of 85° F. The dehydration took about 80 minutes and the weight reduction, due to loss of moisture, was 55%. The moisture content of the partially dehydrated slices was approximately 65%.

(c) The partially dehydrated slices were removed from the drier and immediately subjected to the direct action of steam to heat them to 200° F., this temperature being maintained for 4 minutes.

(d) The hot fruit was immediately packed into #2 sanitary cans using bright tin cans for one lot, enamelled cans for another. The free space in each can was filled with hot (200° F.) syrup in a quantity of 10% of the weight of apple slices. The syrup was an aqueous solution containing 60% sucrose and 0.1% ascorbic acid. The cans were immediately sealed.

(e) The sealed cans were heat processed at 212° F. for 10 minutes then cooled. The canned products were stored 6 months at room temperature.

(f) After the above storage period the cans were opened and the products were examined. It was noted that both products had a bright natural color and both had a good to excellent flavor, the product packed in the enamelled cans being somewhat superior in taste.

*Comparative Test B*

The procedure of Example II was repeated with the sole exception that the dipping solution of part a was an aqueous solution contining 1% salt.

Examination of the canned products revealed that the apple slices were comparable in flavor to those of Example II but had an unnatural golden color.

EXAMPLE III

A lot of Rome Beauty apples was washed, peeled, cored, and sliced. The apple slices were dipped for 2 minutes in an aqueous solution containing 1% salt and 1% citric acid. The slices were drained and then dehydrated in a tunnel drier where they were subjected to a current of air having a dry bulb temperature of 150° F. The dehydration was continued until the apple slices had lost 55% of their original weight due to removal of moisture. The slices were removed from the drier and exposed for 4 minutes to a current of steam and air having a temperature of 200° F. The blanched slices were filled while hot into #10 bright tin cans adding 96½ oz. of apple slices per can. To each can was also added 9 oz. of hot (200° F.) syrup containing 25% sugar, 0.25% citric acid and 0.25% ascorbic acid. The cans were immediately sealed under a vacuum of 5 inches, then held in boiling water for 5 minutes. The cans were cooled and held at 70° F. for 6 months. After this storage time the cans were opened and examined. It was found that the apple slices had a bright natural color and excellent flavor. The insides of the cans were also examined and found to display a very minor degree of mottling indicating that essentially no can corrosion had occurred.

Having thus described the invention, what is claimed is:

1. A process for preserving apples without addition of any sulphiting agent which comprises applying to pieces of raw, fresh apple an aqueous solution containing only water, salt, and a fruit acid, said fruit acid being selected from the class consisting of citric acid, tartaric acid, and malic acid, partially dehydrating the so-treated apple pieces to a moisture content of about from 35 to 70%, then canning the partially-dehydrated apple pieces at essentially the aforesaid moisture content with the application of heat at sterilization temperatures to ensure sterilization of the fruit and container.

2. The process of claim 1 wherein the fruit acid is citric acid.

3. A process for preserving apples without addition of any sulphiting agent which comprises applying to pieces of raw, fresh apple an aqueous solution containing only water, salt, and a fruit acid, said fruit acid being selected from the class consisting of citric acid, tartaric acid, and malic acid, partially dehydrating the so-treated apple pieces to a moisture content of about from 35 to 70%, then canning the partially-dried apple pieces together with about 5 to 15% of their weight of syrup, the canning being with the application of heat at sterilization temperatures to ensure sterilization of the fruit and container.

4. The process of claim 3 wherein the fruit acid is citric acid.

5. The process of claim 3 wherein the syrup contains about from 0.1 to 1% ascorbic acid.

References Cited in the file of this patent

UNITED STATES PATENTS

| | | |
|---|---|---|
| 1,393,540 | Kelly | Oct. 11, 1921 |
| 2,475,838 | Johnson | July 12, 1949 |
| 2,577,704 | Flosdorf | Dec. 4, 1951 |
| 2,583,686 | Dement et al. | Jan. 29, 1952 |
| 2,592,563 | Hall | Apr. 15, 1952 |
| 2,676,889 | Kennan | Apr. 27, 1954 |
| 2,713,003 | Rivoche | July 12, 1955 |
| 2,718,470 | Kaufman et al. | Sept. 20, 1955 |
| 2,752,253 | Talburt | June 26, 1956 |
| 2,768,900 | Vertner | Oct. 30, 1956 |

OTHER REFERENCES

Food Technology, October 1949, pp. 327–331.